April 28, 1970            M. BAEHR            3,509,252
METHOD OF MANUFACTURING FROM AN OPEN ENDED PLASTIC
TUBE A PLASTIC TUBE HAVING A BOTTOM
Filed May 16, 1967

United States Patent Office 3,509,252
Patented Apr. 28, 1970

3,509,252
METHOD OF MANUFACTURING FROM AN OPEN ENDED PLASTIC TUBE A PLASTIC TUBE HAVING A BOTTOM
Michel Baehr, Paris, France, assignor to Isotube, Paris, France, a company of France
Filed May 16, 1967, Ser. No. 638,897
Claims priority, application France, May 24, 1966, 62,705
Int. Cl. B29d 23/10
U.S. Cl. 264—296                                2 Claims

ABSTRACT OF THE DISCLOSURE

A method of manufacturing a plastic tube having a shaped end and an open end from an open-ended plastic tube without using additional material by preliminarily preforming or preshaping a free end length or portion of the open-ended plastic tube in a cup and subsequently carrying out an integration of the preshaped material into a whole defining the bottom of the plastic tube and quickly completing shaping of the preshaped end portion while said material is still softened by application or relative movement, and thereby pressure, between the preshaped end portion and the unheated inner surfaces of a second shaping cup.

BACKGROUND OF THE INVENTION

The present invention relates to plastic tubes having a bottom manufactured from open-ended tubes and more particularly to a method of manufacturing such tubes from open-ended tubes without using additional material.

Various methods of making tubes, of thermoplastic material, with a bottom thereon from open-ended tubes are known. Some of the methods include the use of additional material applied to a starting open-ended tube for forming a bottom thereon. Other methods are known for the making of such tubes from a tubular open-ended blank or tube without the additional material. The French Patent No. 1,083,422 teaches a method consisting of shaping the end of an open-ended tube at a relatively low temperature and subsequently welding or integrating, by moulding, the shaped bottom material at a high temperature in a shaping electrode. This method is adequate for shaping many plastic materials, but cannot be used for making the desired tubes from polyethylene or polypropylene.

Another method of making tubes having a bottom from open-ended tubes is described in the French Patent No. 1,334,991 and in the U.S. Patent No. 3,300,559. In the method described in the U.S. Patent No. 3,300,559, an open-ended tube of thermoplastic material is provided and a free end portion or length of the open-ended tube is simultaneously bent and shaped inwardly toward the axis of the tube and integrated into a whole defining the bottom. This is accomplished in a single simultaneous operation by inserting the open-end portion of the open-ended tube into an open mouth of a shaping cup having a heated bottom having a thin cross-section and of high heat transfer coefficient and applying relative movement and pressure between the tube free end portion and the inner surfaces of the cup comprising the heated bottom inner surface of the shaping cup. The cup bottom is then rapidly cooled subsequent to the tube-shaping and integrating operation while still in contact with the shaped material and the plastic tube and shaping cup are subsequently separated so that the plastic tube is free of the cup.

SUMMARY OF THE INVENTION

It is a principal object of the present invention to provide a method of manufacturing plastic tubes of thermoplastic material from open-ended plastic tubes without additional material and capable of being used for substantially all thermoplastic materials.

The method according to the present invention permits making tubes having a shaped end from substantially all thermoplastic materials by utilizing a particularly simple and economical means and allows forming such tubes in only two successive operations. A preforming or initial shaping operation is carried out at very high temperature, slightly below the melting point of the plastic material, and a second subsequent operation consists, very quickly after the first, in "cold-welding" or integration of the preformed bottom and shaped material while still at a relatively high temperature.

According to the method of the invention, an open-ended tube of thermoplastic material is provided. The material of a free end portion of the open-ended tube is simultaneously bent and preliminary shaped inwardly toward the axis of the tube prior to integrating the inwardly bent material into a whole defining the shape of the end of the formed tube by inserting the open-end portion of the open-ended tube into an open mouth of a first cup having a heated cavity comprising inner surfaces and applying relative movement and pressure between the inner surfaces of the shaping cup and the open-end portion of the tube. According to the shape of the tool being used, various shapes of the end of the tube can be obtained, for example flat bottoms, hemispheric bottoms, partially closed ends, nozzled ends and screwed ends. The tube portion to be shaped may likewise be heated independently of the cup. This shaping cup has a configuration or geometry for substantially simultaneously preliminarily shaping the bent material. The tube portion to be shaped may be heated and pre-shaped at one step or preheated before said heating and preshaping, either by contact against another hot preshaping cup or independently of any other cup, for example by infra-red heating or by hot air. In case of simple shape to be given to said end of tube, there may be not hot air or any other distant means (case of non-closed end like flat beads). The first shaping cup and the preliminary shaped or formed tube are separated and the shaped portion of the tube is then inserted into a second shaping cup which carries out a further or finish shaping operation and by applying relative movement between the tube and the cup inner surfaces and pressure, the preliminary bent or shaped material is integrated into a whole still in a highly heated condition. The relative movement is in fact a stroke like a stamping with a strong hard steel tool shaping instantaneously the pre-softened raw material. The said relative movement has to be preformed very shortly after heating to prevent material to cool back between the two steps of the process. The finally shaped tube and the second shaping cup are then separated and the finished tube is removed.

BRIEF DESCRIPTION OF THE DRAWINGS

Other features, objects and advantages of the method according to the present invention will be better understood as described in conjunction with the following specification and appended claims, and drawing, in which:

DESCRIPTION OF THE PREFERRED EMBODIMENTS

Figures 1, 2, 3, 4, 5:
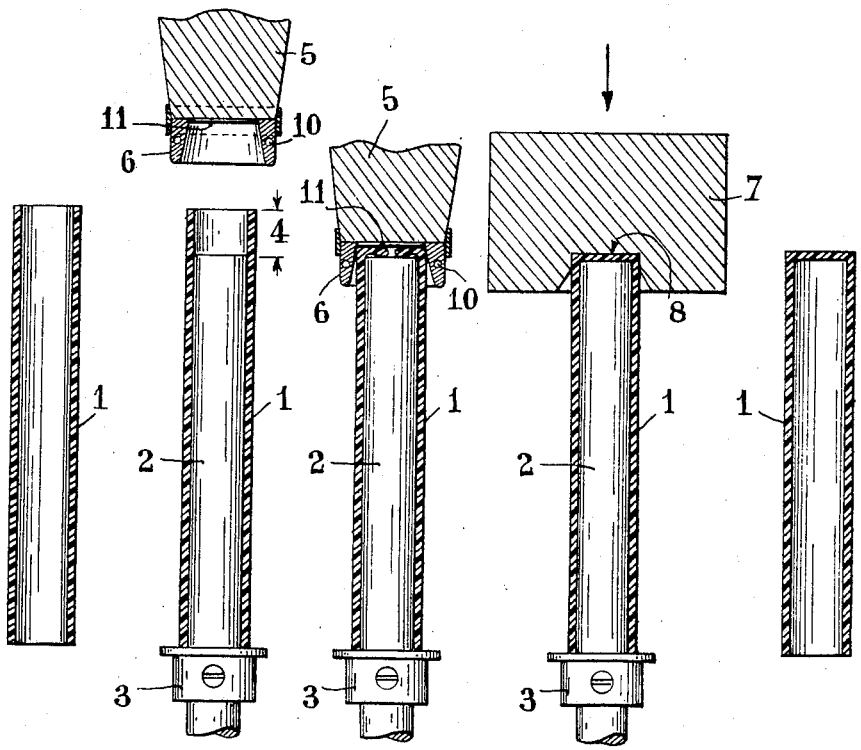
FIGURE 1 is a longitudinal section view of an open-ended plastic tube.
FIGURE 2 is a diagrammatic view of apparatus for preliminarily shaping the plastic tube illustrated in FIG. 1.
FIGURE 3 is a diagrammatic section view of apparatus of FIG. 2 illustrating the preforming or preshaping operation of the method of the invention.
FIGURE 4 is a diagrammatic longitudinal section view of apparatus carrying out a final forming and integrating operation of the tube forming the bottom of the tube.
FIGURE 5 is a longitudinal cross-section view of a finished tube made according to the invention.

In order to carry out the method of the invention and the manufacture of tubes having a bottom thereon and made from open-ended tubes without the additional material, a plastic tube 1 is provided. The plastic tube 1 is made of a thermoplastic material which is deformable or can be rendered deformable by heating and has an axial length greater than the axial length of a finished tube according to the invention. The tube 1 can be made, for example, from tubular extruded stock of suitable plastic material cut to length. The tube 1 is removably mounted in apparatus illustrated diagrammatically and fragmentarily in the drawing, comprising a mandrel 2 having a support abutment 3 on which the tube 1 rests. An end portion or length 4 of the tube extends axially of the mandrel 2 and is free of the mandrel 2. The axial length 4 corresponds to the quantity of plastic material that is required to form a tube bottom on the tube as hereinafter described.

The apparatus for carrying out the invention comprises a first shaping cup 5 made for example with a metallic ring presenting walls or inner surfaces 6 which converge from the open mouth to a metallic piece 5. A coat of Teflon 11 may be inserted between the ring 6 and the cup 5. A cooling circuit is provided in holes 10 of the ring. The shaping cup 5 and the spindle 2 are relatively disposed so that during a shaping operation performed therebetween they are coaxial. Relative movement is applied, by means not shown, between the spindle 2, and therefore the tube, and the shaping cup in order to carry out a preliminary or pre-shaping operation as illustrated in FIGURE 3. The cup cavity is heated, as later explained, to a very high temperature in order to soften the quantity or mass of plastic material in the length 4, projecting above the mandrel 2, to a deformable state. The shaping cup carries out a simultaneously bending and preliminary shaping of the free end portion 5 of the open-ended tube inwardly toward the axis of the tube 1 prior to integrating the inwardly bent material into a whole defining the bottom of the tube as hereinafter explained relative to a second operation.

The cavity defined by the surfaces 6 and 5 is configured to carry out the preliminary shaping of the tube as illustrated in FIG. 3. The first tool may be a more elaborate one. For example, for a shaped bottom, the bottom of the shaping cup is in two parts, the part 5 being strongly heated and the lateral part 6 is cooled by fluid through conducts 10. After the preliminary shaping and bending take place the preliminary shaped tube 1 and the cup 5 are moved relatively to each other so that the spindle 2 and the tube 1 are free of the cup 5.

While the preliminary bent and shaped material of the tube is still at a high temperature in a pliable state, a second shaping cup 7, different from tool 5, having a cavity with an open mouth and comprising inner surfaces which are "cold," that is, free of application of heat thereon, is applied to the preliminary shaped tube for integrating the bent material into a whole or bottom 8 of the plastic tube. The shaping cavity of the second cup is dimensioned and configured to apply the final and finished shape to the plasitc tube by relatively moving the mold or cup 7 relative to the tube 1 and applying a high cup or mold pressure, where necessary, during a period of time to perform the shaping or molding and integration operation. This operation is an instant one i.e. a stroke knocking flat the said softened tube portion. Then, during a short time tube end is cooled by contact against the metal wall of the tool. The final shaping cup carries out the desired integrating and a smoothening or surfacing effect of the tube bottom 8.

The temperatures, pressures and application time of the temperautres and pressures in the method of the invention vary to a wide extent according to the plastic material to be utilized and the thickness thereof. The temperatures generally employed are considerably higher than those on the order of 60° centigrade to 80° centigrade utilized in the foreign methods, for example in the French Patent No. 1,083,422 for forming a polyvinyl chloride tube. The temperature employed in the first shaping operation with this material is in the order of 200° C. to 250° C. When the tube is made of polyethylene, which cannot be formed by high frequency apparatus of the type illustrated in the French Patent No. 1,083,-432, the contact temperature may range from 300° to 350° C. and even more. The heating treatment is determined according to the characteristics or heat sensitivity of the material and the time of application of the heated cup 5 is such as to heat the thermoplastic material of end portion of the tube in its whole to a temperature slightly below the melting point of the plastic material being used, though it may reach in its surface the melting point of this material.

Before the step, the length of tube material to be shaped may also be pre-heated, instead of the shaping cup or both the shaping cup and material to be shaped may be preheated, by radiation, in which case a temperature varying from 600° to 900° C. for the radiation source, in dependence upon the distance from the source to the material being heated, may be employed.

The pressure applied by the preliminary shaping cup 5 depends according to the thermoplastic material being utilized and the quality and nature thereof. In the preliminary forming operation the pressure necessary for hot preliminary shaping of the tube is utilized and it can be seen that this pressure is substantially zero pressure in the case of tubes having a thin wall section, in the order of 0.1 to 0.3 mm. thickness. Where the tube being shaped has a wall thickness in the order of 0.8 to 1 mm. the pressure depends upon the factors; the quality of the material used, the thickness of the wall of the tube, and the temperature of the cup as well as the rapidity with which the performing operation must be performed.

The finishing and integrating operation is performed at a temperature very close to the melting point of the material since the integrating operation takes place substantially immediately after the first forming operation. Dynamic strength of a hammer stroke is used, so the static pressure may be very low, but dynamic strength may be higher. Quick movement is necessary to prevent material to cool before being definitely shaped.

Those skilled in the art will understand that any suitable source of heat may be employed, for example the cup 5 may be heated with a heated element brought into contact therewith, a jet of hot air, by focused radiation concentrated onto the center of the cup, radiation emitted by the electrical plates or resistors, by induction and the like, not shown. The cups themselves are made of suitable metals.

While preferred embodiments of the present invention have been shown and described, it will be understood that many modifications and changes may be made within the true spirit and scope of the invention.

What I claim is:

1. Method of manufacturing from an open-ended plastic tube a plastic tube having a bottom and an open end without using additional material for forming the bottom, which consists of, providing an open-ended tube of deformable, thermoplastic material, and simultaneously bending and shaping a free end portion of the open-ended tube inwardly toward the axis of said tube by inserting said free end portion of the tube into an open mouth of a shaping cup having a bottom heated to a high temperature and applying relative movement and pressure between the inner surfaces of said cup and said free end portion, relative separating said cup and said tube to a position where said tube is free of said cup, and integrating the inwardly bent material into a whole defining said bottom of said tube by inserting the shaped end portion of said tube into an open mouth of an unheated shaping cup having a bottom and applying relative movement and pressure between the inner surfaces of said cup comprising an unheated bottom and unheated inner surfaces of the shaping cup and said shaped end portion of said tube for finally shaping and integrating the heated plastic material to integrate it into said whole, and said unheated bottom surface rapidly cooling the integrated plastic material subsequent to the tube shaping and integrating operation while still in contact with the shaped material, and relatively separating said plastic tube and the unheated cup to a position where said plastic tube is free of said unheated cup.

2. Method of manufacturing from an open-ended plastic tube a plastic tube having a bottom and an open end without using additional material for forming the bottom according to claim 15, in which the high temperature of said first mentioned cup comprises a temperature below and close to the melting point temperature of said thermoplastic material.

References Cited

UNITED STATES PATENTS

| 2,876,496 | 3/1959 | Murphy | 18—56 |
| 2,878,513 | 3/1959 | Slaughter | 18—19 |
| 3,254,147 | 5/1966 | Makada | 264—242 |
| 3,284,560 | 11/1966 | King | 264—292 |
| 3,300,559 | 1/1967 | Baenr | 264—322 XR |

ROBERT F. WHITE, Primary Examiner

R. R. KUCIA, Assistant Examiner

U.S. Cl. X.R.

264—322, 320, 323